United States Patent Office 2,768,978
Patented Oct. 30, 1956

2,768,978

CONTINUOUS PROCESS FOR MAKING 1,5-PENTANEDIOL FROM TETRAHYDROFURFURYL ALCOHOL

James A. Robertson, Lewiston, N. Y., assignor to E. I. du Pont de Nemours and Company, Wilmington, Del.

No Drawing. Application August 28, 1952,
Serial No. 306,967

4 Claims. (Cl. 260—635)

This invention relates to the synthesis of 1,5-pentanediol and more particularly to a continuous process for this synthesis.

A useful intermediate in the production of organic compounds is 1,5-pentanediol $$HOCH_2CH_2CH_2CH_2CH_2OH$$

This compound can add a reactive group at each end of its carbon chain and thus produce linear polymers similar to those of the hexamethylene derivatives. The polyesters so produced are especially valuable as plasticizers. Resins, pharmaceuticals and synthetic rubbers may also be end products of 1,5-pentanediol reactions. The diol nature of the compound supports its use as a textile lubricant, humectant and constituent of brake fluids and printing inks. Since it is miscible in all proportions with water and has a boiling point about 100° C. above that of n-amyl alcohol, it is also of interest in connection with non-volatile anti-freezes.

Patent application Serial Number 306,966, filed of even date herewith, shows a process for the manufacture of 1,5-pentanediol by hydrogenation of tetrahydrofurfuryl alcohol (THFA) over a copper chromite catalyst. The process there disclosed produces the glycol in good yield. It suffers however from the defect that it is a batch process, that is, the reaction vessel employed must be periodically opened, discharged and then recharged with reactive material. A primary object of my invention is development of a novel and useful method for making 1,5-pentanediol. A second object of the invention is development of a process for making 1,5-pentanediol from tetrahydrofurfuryl alcohol. A further object is development of a process for making this diol from THFA in a continuous manner rather than in batches. Still further objects of the invention will be apparent from the remainder of this specification.

I have found that my objectives can be achieved by continuously hydrogenating THFA at temperatures not exceeding 290°–300° C. over a pelleted copper chromite catalyst. The pellets form a bed and are separately bound with an inorganic binder. The equation for the reaction may be written:

(1) 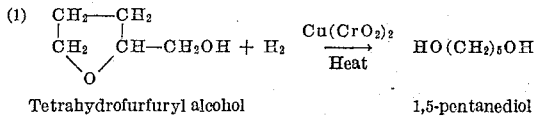

Tetrahydrofurfuryl alcohol          1,5-pentanediol

In this process liquid THFA is slowly passed through the catalytic bed formed of copper chromite pellets while hydrogen under super-atmospheric pressure is passed continuously and simultaneously through the same bed. The temperature is the most important variable to be considered and should not be permitted to rise above 300° C. within the catalytic mass, 250°–300° C. representing a satisfactory range with 270°–290° C. preferred. Below about 250° C. the hydrogenation proceeds too slowly while above 300° C. side reactions interfere noticeably with the yield. Conversion to the glycol varies almost directly with the temperature up to about 290° C.

The catalyst employed in this process is essentially copper chromite in which the $CuO:Cr_2O_3$ ratio may be varied within the limits about 40:60 to 85:15. Optimum results are obtained at above about 45% CuO. For effective results catalytic pellets must be employed, powder clogging up the reaction system. In all cases, an inorganic binder is required to compact the chromite into pellets. Various binders are operative for this purpose including silica, alumina, chromates such as magnesium chromate and silicates such as magnesium and sodium silicate. Practically all of these materials are recognized binders for catalysts and are available commercially for compacting copper chromite. The particular method chosen for forming the pellets is not critical to this invention. One process which may be used includes precipitating copper chromite from quantities of copper nitrate and ammonium chromite chosen to give the desired $CuO:Cr_2O_3$ ratio, adding a calculated amount of an aqueous solution of a binder such as sodium silicate, collecting the impregnated catalyst on a filter, and pelletizing the dry solid.

Generally the binders tend to promote a side reaction not evident in their absence. This reaction is the production of tetrahydropyran which may occur by dehydration of 1,5-pentanediol according to the equation:

(2) 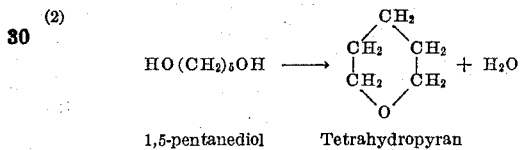

1,5-pentanediol      Tetrahydropyran

Since dehydration of the product obviously lowers the yield, suppression of the side-reaction is desirable. A binder which does suppress the Reaction 2, or at least which fails to promote it, is sodium silicate. $Na_2SiO_3$ is accordingly a preferred binder for the catalysts of this invention. The quantity of binder employed may vary. It should usually constitute between about 2% and not more than about 10% of the entire weight of the catalyst. The size of the pellets employed is not critical. They must not be so small as to clog up the reaction bed or so large or non-porous as to have almost no effective surface. Commercial cylindrical pellets ⅛″ or 3/16″ in diameter and of about the same thickness yield good results.

The feed rate of THFA is almost of as much importance as the conversion temperature or the catalyst. At a given temperature an increase in the rate of feed of THFA through the reactor results in an increase in yield but a decrease in conversion to 1,5-pentanediol. The reaction involved here is exothermic so the temperature tends to rise with the feed rate. Desirable limits are between about .25 and 3.0 v./v./hr., the abbreviation v./v./hr. possessing its usual meaning of volume of liquid fed per unit volume of catalyst bed per hour. The catalyst beds employed in the experiments shown here had volumes of 500 cc. Higher feed values might be used with larger beds.

The pressure of the hydrogen supplied to the system is not sharply critical. If however too low a value is employed the reaction slows down to an undesirable extent. At least 10 atmospheres should be maintained to obtain efficient reaction rates but lower values can be employed if extremely low conversions are tolerable. An upper limit need only be set by the strength of the apparatus available. In practice about 4200–4400 lbs./in.² are satisfactory. The rate of hydrogen venting is also of no critical importance. Variation of this rate between 1.3 and 45 l./min. in a series of continuous hydrogenation runs showed no significant effects.

Further details of my invention may be understood from the following illustrative examples:

EXAMPLE 1

A series of runs was made passing THFA and $H_2$ at a pressure of around 4300 lbs./in.$^2$ co-currently through 500 cc. of copper chromite pellets. The $CuO:Cr_2O_3$ ratio in these pellets was 53:44, with silica constituting not more than 10% of the total weight of the catalyst. Products were separated by fractional distillation. Results are summarized in Table I:

Table I

| Run | Temp., °C. | Liq. Feed, cc./hr. | 1,5-Pentanediol | | By-Products (Percent) | |
|---|---|---|---|---|---|---|
| | | | Percent Yield | Percent Conversion | THP[1] | 1-P[2] |
| 1 | 278 | 750 | 71 | 25 | 23 | 9 |
| 2 | 279 | 285 | 49 | 24 | 40 | 10 |
| 3 | 289 | 310 | 32 | 18 | 55 | 12 |
| 4 | 291 | 790 | 52 | 22 | 32 | 18 |

[1] THP is tetrahydropyran.
[2] 1-P is 1-pentanol.

It will be noted that both yields and conversions are given for 1,5-pentanediol. These terms may be defined, as used here, by the following equations:

$$\text{Percentage yield} = \frac{\text{Moles 1,5-pentanediol produced}}{\text{Moles THFA consumed}} \times 100$$

$$\text{Percentage conversion} = \frac{\text{Moles 1,5-pentanediol produced}}{\text{Moles THFA charged}} \times 100$$

EXAMPLE 2

Several runs were made passing hydrogen and THFA co-currently through 500 cc. of copper chromite catalyst similar to that used in Example 1 except that it was bound with magnesium chromate, $MgCrO_4$ instead of silica. Hydrogen pressure was as before. Results are tabulated in:

Table II

| Run | Temp., °C. | Liq. Feed, cc./hr. | 1,5-Pentanediol | | By-Products (Percent) | |
|---|---|---|---|---|---|---|
| | | | Percent Yield | Percent Conversion | THP[1] | 1-P[2] |
| 5 | 279 | 750 | 78 | 34 | 13 | 9 |
| 6 | 276 | 300 | 62 | 37 | 24 | 13 |
| 7 | 277 | 1,530 | 83 | 24 | 4.1 | 10 |
| 8 | 260.5 | 1,610 | 89 | 15 | | 11 |

[1] THP is tetrahydropyran.
[2] 1-P is 1-pentanol.

EXAMPLE 3

The procedure of Examples 1 and 2 was followed using a chromite catalyst like those used before except that it was bound with magnesium silicate, $MgSiO_3$. Table III shows the results obtained.

Table III

| Run | Temp., °C. | Liq. Feed, cc./hr. | 1,5-Pentanediol | | By-Products (Percent) | |
|---|---|---|---|---|---|---|
| | | | Percent Yield | Percent Conversion | THP[1] | 1-P[2] |
| 9 | 277 | 730 | 60.5 | 20.3 | 25.4 | 7.8 |
| 10 | 277 | 292 | 38.5 | 20.4 | 46.0 | 12.2 |

[1] THP is tetrahydropyran.
[2] 1-P is 1-pentanol.

The procedure used previously was repeated in runs using the preferred catalyst with a $CuO:Cr_2O_3$ ratio of 53:44 and containing not more than 10% by weight of sodium silicate, $Na_2SiO_3$. The catalyst employed was obtained commercially as were the others shown in these examples. Results are given in Table IV. The temperatures of these runs, between 275° and 280° form an optimum range within the preferred range of 270°–290° C.

Table IV

| Run | Temp., °C. | Liq. Feed, cc./hr. | 1,5-Pentanediol | | By-Products (Percent) | |
|---|---|---|---|---|---|---|
| | | | Percent Yield | Percent Conversion | THP[1] | 1-P[2] |
| 11 | 277.4 | 760 | 93 | 13.4 | | 6.3 |
| 12 | 277.7 | 326 | 90 | 20.9 | | 7.4 |
| 13 | 275.2 | 122 | 92 | 32.0 | | 8.9 |

[1] THP is tetrahydropyran.
[2] 1-P is 1-pentanol.

It will be noted that no tetrahydropyran was formed with catalysts pelletized with a sodium silicate binder and that 1,5-pentanediol yields are correspondingly increased. For this reason sodium silicate is the preferred binder.

Various modifications in the Examples given above and in my process as a whole will be evident to those skilled in the art. It is not necessary, for instance, that the tetrahydrofurfuryl alcohol employed be entirely pure. The only requirement is that any impurities present be relatively inert, that is, they must not react with THFA, 1,5-pentanediol, the catalyst or hydrogen in such a manner as to interfere with the desired reaction. Materials possessing the requisite inertness include compounds related to tetrahydrofurfuryl alcohol and furfural derivatives in general. Since THFA is frequently made directly by hydrogenating furfural, it thus becomes possible to use a two-step process in which THFA is first made from the fairly common furfural and then hydrogenated to 1,5-pentanediol by the procedure shown above without an intermediate separation from the by-products of the first step.

A satisfactory process starting with furfural comprises a first step of hydrogenating furfural over a foraminous cobalt catalyst, a second step of hydrogenating the product of the first step, which product may contain large amounts of THFA, over copper chromite. A suitable process for producing THFA from furfural is shown by British Patent 627,293 disclosing foraminate cobalt-aluminum and nickel-aluminum as catalysts for the reaction. In one example of this patent a 50:50 mixture of furfural and THFA was continuously injected over a foraminate cobalt catalyst at 50° C. with hydrogen under pressure. Substantially complete conversion of the furfural to THFA resulted and pure THFA was obtained on redistillation. This redistillation step is of course unnecessary for the purposes of my invention. The crude product obtained here may merely be injected continuously with hydrogen over the copper chromite catalyst. It is desirable for the sake of efficiency that the liquid subsequently hydrogenated to 1,5-pentanediol contain a substantial amount, 50–75% or an even greater proportion, of THFA. Consequently the British process is excellent for producing a material suitable for further hydrogenation by my method. A third step of separating the product by fractional distillation may and usually will be added to the other two. Although the second step may be carried out in batches continuous operation is economically desirable. The result is therefore a continuous process for producing 1,5-pentanediol in two steps or in three if the separation be included. Other known methods of hydrogenating furfural to THFA may of course be substituted for that of the British patent shown above as constituting a desirable first step.

Further modifications may be made in my process without departing from the spirit thereof. The examples cited, for instance, show only co-current flow of hydrogen and THFA. Countercurrent flow may obviously be used instead of co-current. In either case the apparatus employed, which forms no part of the invention, may be conventional hydrogenation equipment adapted to withstand the pressures required and to provide a retainer for the catalyst bed. Temperatures may be controlled in any convenient manner. If the preferred feed rates given for the 500 cc. bed, that is, rates within the range 0.25 and 3.0 v./v./hr., be employed little external cooling as by an ice bath or water jacket is required. When initiating a continuous hydrogenation it may be desirable to preheat either or both the THFA and $H_2$ but this becomes unnecessary after the reaction starts. Since still further obvious modifications of the invention are possible, I propose to be bound solely by the annexed claims.

Having described my invention, I claim:

1. The method of producing 1,5-pentanediol in the substantial absence of tetrahydropyran which comprises simultaneously and continuously passing hydrogen under superatmospheric pressure and tetrahydrofurfuryl alcohol through a catalyst bed formed of copper chromite pellets with a $CuO:Cr_2O_3$ ratio of from 40:60 to 85:15 at a temperature between 250° and 300° C., said pellets containing a sodium silicate binder.

2. The method of claim 1 in which each of said copper chromite pellets is bound together by means of a sodium silicate binder constituting between about 2% and 10% of its weight.

3. The method of claim 2 in which the feed rate of tetrahydrofurfuryl alcohol is between about 0.25 and 3.0 v./v./hr.

4. The process of obtaining 1,5-pentanediol which comprises forming a mixed product by continuously and simultaneously passing hydrogen and a liquid containing a substantial proportion of tetrahydrofurfuryl alcohol through a catalyst bed formed of copper chromite pellets, each of said pellets being bound together by not more than about 2–10% of its weight of sodium silicate and possessing a $CuO:Cr_2O_3$ ratio of 53:44, at a temperature of between about 275° and 280° C. and a hydrogen pressure of 4200–4400 lbs./in.$^2$ References Cited in the file of this patent

UNITED STATES PATENTS

| | | |
|---|---|---|
| 2,265,682 | Bennett et al. | Dec. 9, 1941 |
| 2,497,812 | Copelin | Feb. 14, 1950 |
| 2,546,019 | Smith | Mar. 20, 1951 |

FOREIGN PATENTS

| | | |
|---|---|---|
| 627,293 | Great Britain | Aug. 5, 1949 |

OTHER REFERENCES

Connor et al.: J. A. C. S., vol. 54, 1931, pp. 1138–1145.

Iowa State Coll. Jour. of Science, vol. 12 (1937) (Menzel), pp. 142–144.

"Organic Synthesis," vol. 26 (1946), p. 83; pub. by John Wiley & Sons, New York, N. Y.

Bull. Soc. Chim. de France (1947) (Paul), pp. 165–168.

Groggins: "Unit Processes in Organic Synthesis," 3d ed. (1947), pp. 539 and 540. Pub. by McGraw-Hill Book Co., New York, N. Y.

Indust. and Engineering Chemistry (February 1948) (Wojcik), pp. 211 and 216.